(12) United States Patent
Wang et al.

(10) Patent No.: US 12,518,144 B2
(45) Date of Patent: Jan. 6, 2026

(54) HEARTBEAT CLASSIFICATION METHOD AND DEVICE FOR MULTI-TAG ECG SIGNAL LABELING

(71) Applicant: Shanghai Lepu CloudMed Co., Ltd, Shanghai (CN)

(72) Inventors: Bin Wang, Songjiang District (CN); Chang Liu, Songjiang District (CN)

(73) Assignee: Shanghai Lepu CloudMed Co., Ltd, Shanghai (CN)

( * ) Notice: Subject to any disclaimer, the term of this patent is extended or adjusted under 35 U.S.C. 154(b) by 791 days.

(21) Appl. No.: 17/758,937

(22) PCT Filed: Dec. 9, 2020

(86) PCT No.: PCT/CN2020/134755
§ 371 (c)(1),
(2) Date: Jul. 15, 2022

(87) PCT Pub. No.: WO2021/143402
PCT Pub. Date: Jul. 22, 2021

(65) Prior Publication Data
US 2023/0342595 A1    Oct. 26, 2023

(30) Foreign Application Priority Data

Jan. 17, 2020 (CN) .......................... 202010052894.4

(51) Int. Cl.
*G06N 3/048* (2023.01)
*G06N 3/084* (2023.01)
(Continued)

(52) U.S. Cl.
CPC ............. *G06N 3/048* (2023.01); *G06N 3/084* (2013.01); *G16H 50/70* (2018.01); *A61B 5/318* (2021.01)

(58) Field of Classification Search
CPC .......... G06N 3/048; G06N 3/084; G06N 3/09
See application file for complete search history.

(56) References Cited

U.S. PATENT DOCUMENTS

2012/0016218 A1* 1/2012 Lau ..................... A61B 5/7264
600/323
2012/0136255 A1   5/2012 Fan et al.

FOREIGN PATENT DOCUMENTS

| CN | 109377470 A | 2/2019 |
| CN | 111275093 A | 6/2020 |

(Continued)

OTHER PUBLICATIONS

International Search Report for International Application No. PCT/CN2020/134755 dated Mar. 10, 2021, 2 pages.

(Continued)

*Primary Examiner* — Grace Park
(74) *Attorney, Agent, or Firm* — TraskBritt

(57) ABSTRACT

A heartbeat classification method for multi-tag ECG signal labeling includes acquiring a heartbeat time sequence, and performing data segmentation on the heartbeat time sequence to obtain multiple data segments; inputting the data segments into a trained multi-tag classification model, the multi-tag classification model including a feature extraction module, a fully connected layer and a Sigmoid activation function layer; performing feature extraction on the input data segments to obtain high-dimensional embedded information, including heartbeat class information corresponding to each of the data segments; sending the high-dimensional embedded information into the fully connected layer, and outputting a one-dimensional vector including a number of heartbeat classes of the data segments; inputting the one-dimensional vector into the Sigmoid activation function layer, and outputting probability values for the number of each of the heartbeat classes; and outputting a (Continued)

heartbeat class having a probability value exceeding a preset probability threshold as a heartbeat classification result.

9 Claims, 4 Drawing Sheets

(51) Int. Cl.
    *G16H 50/70*     (2018.01)
    *A61B 5/318*     (2021.01)

(56) References Cited

FOREIGN PATENT DOCUMENTS

| CN | 107981858 B | * | 12/2020 | ............. | A61B 5/318 |
|---|---|---|---|---|---|
| CN | 109948647 | | 2/2021 | | |
| CN | 109620152 | | 9/2021 | | |

OTHER PUBLICATIONS

International Written Opinion for International Application No. PCT/CN2020/134755 dated Mar. 10, 2021, 4 pages.
Chinese Office Action for Application No. 202010052894.4 dated Feb. 22, 2023, 13 pages.

\* cited by examiner

HEARTBEAT CLASSIFICATION METHOD AND DEVICE FOR MULTI-TAG ECG SIGNAL LABELING

CROSS-REFERENCE TO RELATED APPLICATIONS

This application is a national phase entry under 35 U.S.C. § 371 of International Patent Application PCT/CN2020/134755, filed Dec. 9, 2020, designating the United States of America and published as International Patent Publication WO 2021/143402 A1 on Jul. 22, 2021, which claims the benefit under Article 8 of the Patent Cooperation Treaty to Chinese Patent Application Serial No. 202010052894.4, entitled "HEARTBEAT CLASSIFICATION METHOD AND DEVICE FOR MULTI-TAG ECG SIGNAL LABELING," filed with the China National Intellectual Property Administration on Jan. 17, 2020.

TECHNICAL FIELD

The disclosure relates to the technical field of signal processing, in particular, to a heartbeat classification method and device for multi-tag ECG signal labeling.

BACKGROUND

Cardiovascular diseases are principal diseases that threaten human health, and it is a current worldwide concern to detect the cardiovascular diseases by means of effective means.

In modern medicine, ECGs are mainly used to diagnose cardiovascular diseases, and the use of ECGs to diagnose various cardiovascular diseases is essentially a process of ECG classification by extracting feature data of the ECGs If a classified sample is of only one specific class, it involves traditional signal-tag classification. However, in most classification tasks, one sample may include information of multiple classes, so it is impossible to determine the heartbeat class of ECG signals through the traditional single-tag classification method when ECG data is related to different diseased regions of the heart and needs to be labeled with multiple tags.

BRIEF SUMMARY

The object of the disclosure is to overcome the defects of the prior art by providing a heartbeat classification method for multi-tag ECG signal labeling. The method adopts a multi-tag classification model to perform heartbeat classification on data segments of heartbeat data in conjunction with a heart impulse conducting model. The multi-tag classification model is obtained by labeling and training data segments of heartbeat data through a multi-tag method according to different diseased regions of the heart. The method solves the problems of conflicts caused by single-tag labeling and too few samples caused by complex-labeling of diseases, and effectively improves the classification performance of a system.

To fulfill the above objective, in a first embodiment, the disclosure provides a heartbeat classification method for multi-tag ECG signal labeling, comprising:

Acquiring a heartbeat time sequence, and performing data segmentation on the heartbeat time sequence to obtain multiple data segments of multi-lead heartbeat data, the heartbeat time sequence comprising the multi-lead heartbeat data;

Inputting the data segments into a trained multi-tag classification model, the multi-tag classification model comprising a feature extraction module, a fully connected layer and a Sigmoid activation function layer;

Performing feature extraction on the input data segments by the feature extraction module to obtain high-dimensional embedding information, the high-dimensional embedding information comprising heartbeat class information corresponding to each of the data segments;

Sending the high-dimensional embedding information into the fully connected layer, and outputting a one-dimensional vector [1, N], wherein N is the class number of heartbeat classes of the data segments;

Inputting the one-dimensional vector [1, N] into the Sigmoid activation function layer, and outputting probability values of the heartbeat classes, the probability values being within [0, 1]; and Determining whether the probability values exceed a preset probability threshold, and outputting a heartbeat class having a probability value exceeding the preset probability threshold as a heartbeat classification result.

Preferably, before the step of inputting the data segments into a trained multi-tag classification model, the method further comprises:

Training the multi-tag classification model.

Further preferably, training the multi-tag classification model comprises:

Acquiring a heartbeat time sequence used as a training sample, and performing data segmentation on the heartbeat time sequence used as the training sample to obtain multiple sample data segments, each of the sample data segments having a classification tag corresponding one or more manually labeled heartbeat classes;

Recognizing a classification tag of a data segment having both a ventricular type and a supraventricular type from the classification tags, and splitting the classification tag to obtain split tags, each of the split tags corresponding to one heartbeat class;

Performing data combination and format conversion on the sample data segments to obtain an output tensor and split tags of the heartbeat time sequence used as the training sample;

Inputting the output tensor and the split tags of the training sample into a multi-tag classification model to be trained, and obtaining a predicted value of a pre-classification-result of the training sample according to the output tensor of the training sample;

Calculating a forward propagation loss of the multi-tag classification model according to a difference between the predicted value of the pre-classification-result and the tag value of the classification tag and/or the split tag, as well as a loss function;

Calculating a backward propagation gradient of the multi-tag classification model through a stochastic gradient descent algorithm according to the forward propagation loss of the multi-tag classification model;

Updating model parameters of the multi-tag classification model according to the backward propagation gradient; and Obtaining the trained multi-tag classification model when the number of iterations reaches a set training number.

Further preferably, when the number of iterations does not reach the set training number, a next iteration for training is performed on the multi-tag classification model with updated model parameters.

Further preferably, processing the data segments to obtain an output tensor of the heartbeat time sequence after tag splitting comprises:

Performing data combination on the multiple data segments of the multi-lead heartbeat data to obtain four-dimensional tensor, the four-dimensional tensor having four factors {B, H, W, C}, wherein the factor B is a batch of data, the factor H is a height, the factor W is a width, and the factor C is channel data; the batch of data is the number of groups of heartbeat analysis data; and Performing tensor format conversion on the four-dimensional tensor to shrink channel data in the four-dimensional tensor to 1, and outputting an output tensor {B, $H_1$, $W_1$, 1} of the heartbeat time sequence.

Further preferably, the loss function for calculating the forward propagation loss of the multi-tag classification model according to the difference between the predicted value of the pre-classification-result and the tag value of the manually labeled tag is as follows:

$$J(w) = \frac{1}{N}\sum_{n=1}^{N}H(y_n, \hat{y}_n) = -\frac{1}{N}\sum_{n=1}^{N}\sum_{i=1}^{T}[y_n^{(i)}\log\hat{y}_n^{(i)} + (1-y_n^{(i)})\log(1-\hat{y}_n^{(i)})]$$

Wherein, $y_n$ is the tag value, $\hat{y}_n$ is the predicted value, N is the number of training samples, and T is the class number of heartbeat classes of each group of training samples.

Preferably, performing feature extraction on the output tensor by the feature extraction module comprises:

Performing feature extraction on the output tensor by the feature extraction module through a CNN or a RNN.

The heartbeat classification method for multi-tag ECG signal labeling provided by the embodiments of the disclosure adopts a multi-tag classification model to perform heartbeat classification on data segments of heartbeat data in conjunction with a heart impulse conducting model. The multi-tag classification model is obtained by labeling and training data segments of heartbeat data through a multi-tag method according to different diseased regions of the heart. The method solves the problems of conflicts caused by single-tag labeling and too few samples caused by complex-labeling of diseases, and effectively improves the classification performance of the system.

In a second embodiment, the embodiments of the disclosure provide an equipment, comprising a memory and a processor, wherein the memory is used to store a program, and the processor is used to implement the method in the first embodiment and in various implementations of the first embodiment.

In a third embodiment, the embodiments of the disclosure provide a computer program product including instructions. When the computer program product runs on a computer, the computer is enabled to implement the method in the first embodiment and in various implementations of the first embodiment.

In a fourth embodiment, the embodiments of the disclosure provide a computer-readable storage medium having a computer program stored therein, wherein when the computer program is executed by a processor, the method in the first embodiment and in various implementations of the first embodiment is implemented.

DETAILED DESCRIPTION

The technical solution of the disclosure will be described in further detail below in conjunction with the accompanying drawings and embodiments.

Figure 1:
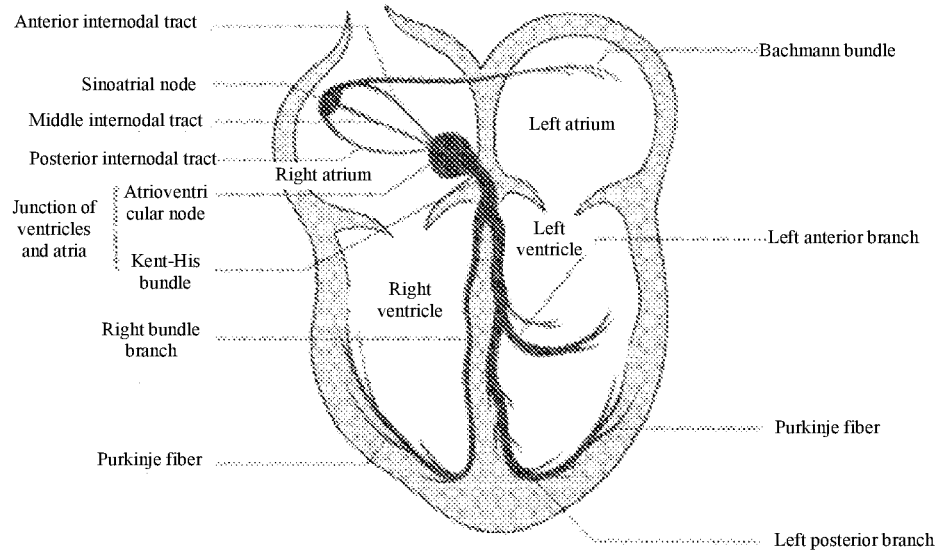
FIG. 1 is a schematic diagram of a heart impulse conducting system according to one embodiment of the disclosure.

One embodiment of the disclosure provides a heartbeat classification method for multi-tag ECG signal labeling, which is used for heartbeat classification for multi-tag ECG signal labeling in conjunction with a heart impulse conducting model. FIG. 1 is a schematic diagram of a heart impulse conducting system according to one embodiment of the disclosure. The heart impulse conducting system will be explained first in conjunction with FIG. 1 below.

Impulses are conducted into the heart sequentially through an approach sinoatrial node→atrium→junction of atrium and ventricle (atrioventricular node and Kent-His bundle)→bundle branch→Purkinje fiber. This approach is consisted of auto-rhythmic special cardiac muscle cells and is called the impulse conducting system. In the whole impulse conducting system, diseases will occur in multiple regions, and if in this case, these regions will be reflected in an ECG waveform, namely in a heartbeat time sequence formed by multi-lead heartbeat data.

Figure 2:
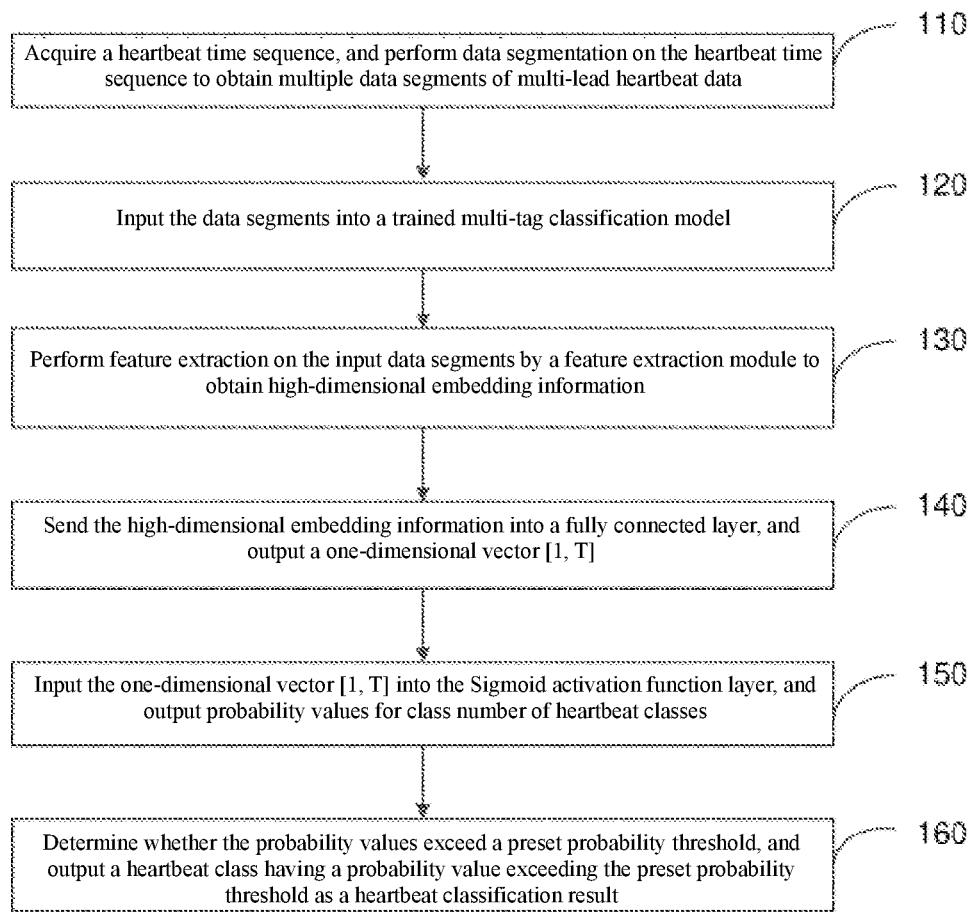
FIG. 2 is a flow diagram of a heartbeat classification method for multi-tag ECG signal labeling according to one embodiment of the disclosure.

FIG. 2 illustrates a flow diagram of the heartbeat classification method for multi-tag ECG signal labeling based on the heart impulse conducting model. The heartbeat classification method for multi-tag ECG signal labeling comprises the following steps:

Step 110, a heartbeat time sequence is acquired, and data segmentation is performed on the heartbeat time sequence to obtain multiple data segments of multi-lead heartbeat data;

Wherein, the heartbeat time sequence comprises the multi-lead heartbeat data.

Specifically, data segmentation may be performed on multi-lead heartbeat data according to a set data size to obtain multiple data segments of the multi-lead heartbeat data. The data segmentation may be performed according to a set time length or a preset heartbeat quantity.

Step 120, Inputting the data segments to a pre-trained multi-tag classification model;

Specifically, the multi-tag classification model comprises a feature extraction module, a fully connected layer and a Sigmoid activation function layer.

A training process of the multi-tag classification model will be explained in detail below.

Step 130, the feature extraction module performs feature extraction on the data segments to obtain high-dimensional embedding information;

Specifically, the feature extraction module performs feature extraction on the input data segments through a Convolutional Neural Network (CNN) or a Recursive Neural Network (RNN). In one specific application example, the structure of the feature extraction module is shown in FIG.

3. The high-dimensional embedding information obtained by feature extraction comprises heartbeat class information corresponding to each of the data segments.

Step 140, the high-dimensional embedding information is sent to the fully connected layer, and a one-dimensional vector [1, T] is output;

Wherein, T is the number of classes heartbeat classes of the data segments;

Specifically, the high-dimensional embedding information obtained by feature extraction is sent to the fully connected layer, wherein the fully connected layer mentioned here is a fully connected module that may comprise one or more fully connected layers, and an output of the fully connected module is the one-dimensional vector [1, T] and is sent to the Sigmoid activation function layer.

Step 150, the one-dimensional vector [1, T] is inputted to the Sigmoid activation function layer, and probability values of the heartbeat classes corresponding to the number of classes are outputted;

Specifically, different from a single-tag classification network of which an activation function is a softmax function, an activation function of the multi-tag classification network is a Sigmoid function, which can guarantee a high confidence of multiple output classes.

After being processed by the Sigmoid activation function, an output probability will be limited within [0, 1], which physically means the probability of a sample comprising a certain class. A probability threshold $\beta$ is set; if the probability value exceeds the probability threshold, it is determined that this class appears in the sample; otherwise, it is determined that this class does not appear in the sample.

Step 160, whether the probability values exceed a preset probability threshold is determined, and a heartbeat class having a probability value exceeding the preset probability threshold is output as a heartbeat classification result.

For example, assume the number of classes of heartbeat classes is T=6, $\beta$=0.8 and other specific values are shown in Table 1, the probability values of class N, class CLB and class RB are high and exceed the threshold after being processed by the activation function, so a system determines that class N, class CLB and class RB appear.

TABLE 1

|  | N | Af | AF | CLB | CRB | RB |
|---|---|---|---|---|---|---|
| Before the activation function | 6.5 | −0.2 | −7.1 | 3.3 | −6 | 2 |
| After the activation function | 0.9985 | 0.4502 | 0.0008 | 0.9644 | 0.0025 | 0.8808 |

Through the method mentioned above, the problems of conflicts caused by single-tag labeling and too few samples caused by complex-labeling of diseases are solved, and the classification performance of the system is effectively improved.

The multi-tag classification model used in the method is obtained by labeling and training data segments of heartbeat data through a multi-tag method according to different diseased regions of the heart. The training process of the multi-tag classification model will be explained below.

Figure 4:
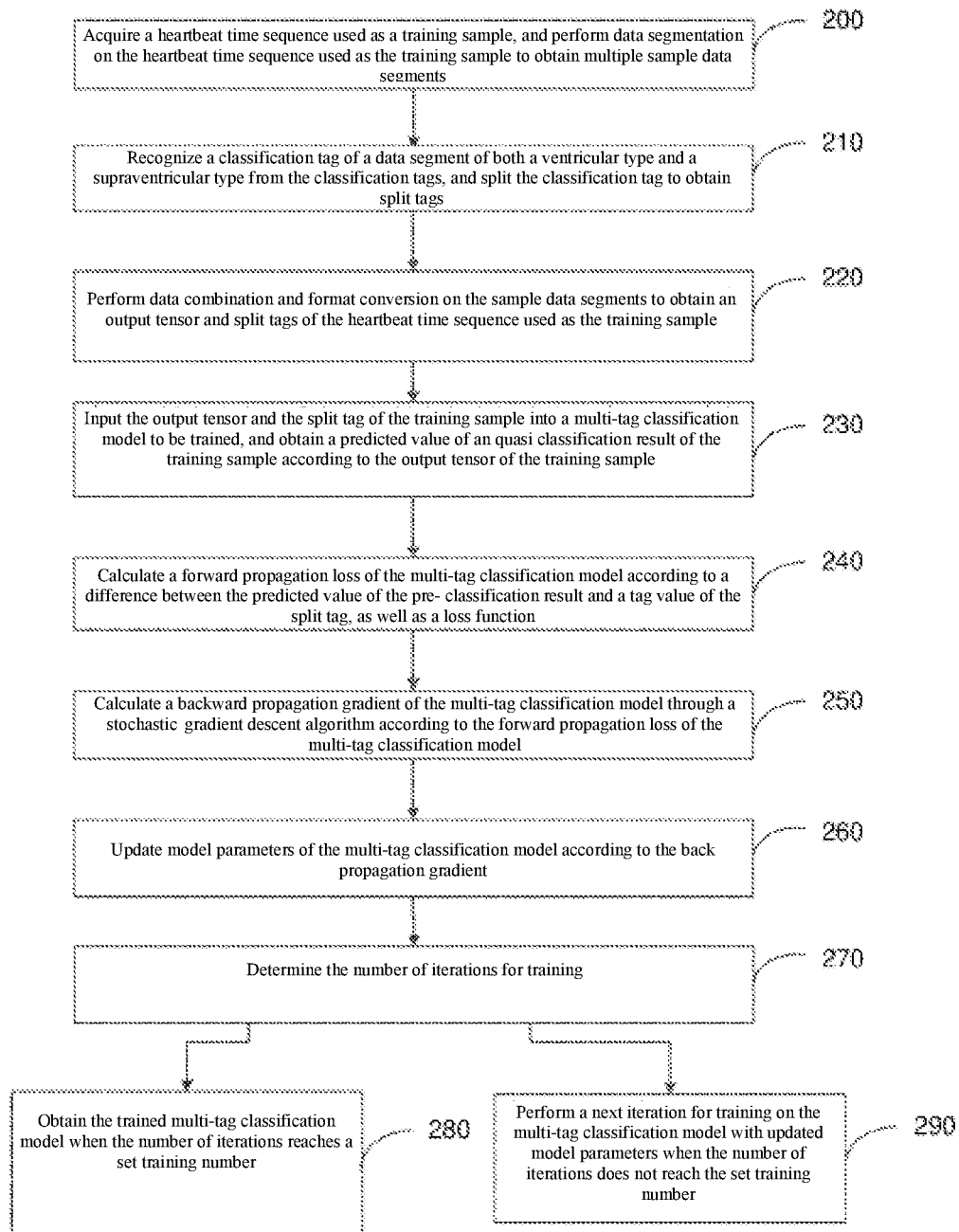
FIG. 4 is a flow diagram of the steps of a method for training a multi-tag classification model according to one embodiment of the disclosure.

As shown in FIG. 4, the main steps for training the multi-tag classification model are as follows:

Step 200, a heartbeat time sequence used as a training sample is acquired, and data segmentation is performed on the heartbeat time sequence used as the training sample to obtain multiple sample data segments;

Specifically, in the input heartbeat time sequence used as the training sample, the data segments are manually labeled first with classification tags corresponding to one or more heartbeat classes.

In the multi-tag classification system, one input X may correspond to a single tag or correspond to multiple tags. Wherein, x1, x2, x3, . . . , xn correspond to multiple samples, and Y1, Y2, Y3 and Y4 correspond to tag classes (classification tags).

One specific example is shown in Table 2:

TABLE 2

| X | Y1 | Y2 | Y3 | Y4 |
|---|---|---|---|---|
| x1 | 0 | 1 | 1 | 0 |
| x2 | 1 | 0 | 0 | 0 |
| x3 | 1 | 0 | 0 | 1 |
| . . . | . . . | . . . | . . . | . . . |
| xn | 0 | 0 | 1 | 1 |

Step 210, a classification tag of a data segment having both a ventricular type and a supraventricular type is recognized from the classification tags, and is split to obtain split tags;

In one specific example, tag splitting is shown in Table 3.

Wherein, different heartbeat classes may be labeled by split tags: N represents sinus, CLB represents left bundle branch block, CRB represents right bundle branch block, Af represents atrial fibrillation, AF represents atrial flutter, and RVH represents right ventricular hypertrophy.

The classification tags may be specifically as follows:

The classification tag N indicates that heartbeats in the data fragment are triggered by the sinoatrial node, and the atria and the ventricles are normal. The classification tag N CRB indicates that heartbeats in the data fragment are triggered by the sinoatrial node and that the atria are normal, while the ventricles suffer from right bundle branch block. The classification tag may also be Af_CLB, AF_RVH, AF_RB, or the like. In this disclosure, the classification tag of the data fragment of both the ventricular type and the supraventricular type is recognized and is split to obtain split tags. The ventricular type relates to diseases in the ventricles, and the supraventricular type relates to diseases in the atria or at the junction of the ventricles and the atria.

That is, a classification tag marking a sinus rhythm or an atrial rhythm (atrial flutter and atrial fibrillation) accompanied with a ventricular disease is split into a ventricular part and a supraventricular part, wherein the ventricular part relates to a ventricular disease, such as left bundle branch block or right bundle branch block.

TABLE 3

| Classification tag | Explanation | Split tag |
|---|---|---|
| N | Sinus | N |
| N_CRB | Sinus, accompanied with right bundle branch block | N + CRB + RB |

TABLE 3-continued

| Classification tag | Explanation | Split tag |
| --- | --- | --- |
| Af_CLB | Atrial fibrillation, accompanied with left bundle branch block | Af + CLB + RB |
| AF_RVH | Atrial flutter, accompanied with right ventricular hypertrophy | AF + RVH |
| AF_RB | Atrial flutter, accompanied with intraventricular block | AF + RB |

That is, each split tag corresponds to one heartbeat class.

Step 220, data combination and format conversion are performed on the data segments of the sample to obtain an output tensor and a split tag of the heartbeat time sequence used as the training sample;

As for a training sample not requiring tag splitting, the classification tag is directly used as the split tag. That is to say, the classification tags of data fragments without the ventricular type and the supraventricular type are directly used as split tags.

The data combination and format conversion are performed as follows: data combination is performed on multiple data segments of the sample to obtain four-dimensional tensor, wherein the four-dimensional tensor has four factors {B, H, W, C}, the factor B is batch size of data, the factor H is a height, the factor W is a width, and the factor C is the channel number of data, and the batch size of data is the number of groups for multiple of heartbeat analysis data; and then, tensor format conversion is performed on the four-dimensional tensor to shrink the channel number of data to 1, and a tensor shaped as $\{B, H_1, W_1, 1\}$ of the heartbeat time sequence used as the sample is output. Wherein, the output tensor obtained after tag splitting has a corresponding split tag;

This step is performed by a primary feature extraction (Stem) module. The Stem module may involve a convolution operation, and may adopt a frequency-domain feature extraction method such as Fourier transform or wavelet transform. The Stem module can perform primary feature extraction and dimension adjustment of an input tensor. Dimension adjustment has the following two effects:

(1) The ECG classification network is made to support various input tensor data as well as support single-lead and multi-lead data, which can eliminated the influence of different types of input;

(2) The length of heartbeat time sequence can be decrease, which in turn can greatly improve the performance of the whole model.

Step 230, the output tensor and the split tag of the training sample are input into a multi-tag classification model to be trained, and a predicted value of a pre-classification-result of the training sample is obtained according to the output tensor of the training sample;

Wherein the multi-tag classification module, as mentioned above, comprises a feature extraction module, a fully connected layer and a Sigmoid activation function layer.

Figure 3:
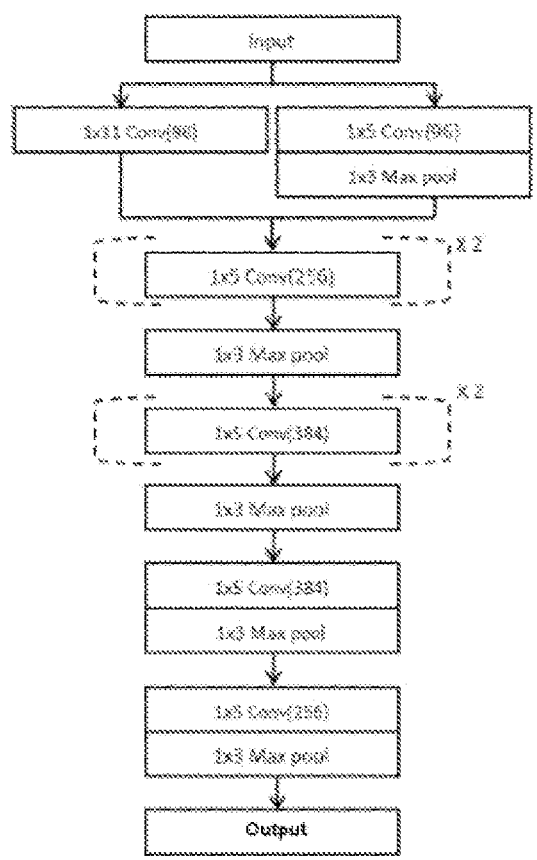
FIG. 3 is a structural diagram of a feature extraction module according to one embodiment of the disclosure.

The feature extraction module performs feature extraction on the output tensor by means of a CNN or an RNN. In one specific application example, the structure of the feature extraction module is shown in FIG. 3.

High-dimensional embedding information is sent into the fully connected layer, and a one-dimensional vector [1, T] is output based on the split tag, wherein T is the number of heartbeat classes of the data segments;

Wherein the high-dimensional embedding information obtained by feature extraction is sent into the fully connected layer, wherein the fully connected layer mentioned here refers to a fully connected module comprising one or more fully connected layers; and an output of the fully connected module is the one-dimensional vector [1, T] and is sent into the Sigmoid activation function layer.

The one-dimensional vector [1, T] is input to the Sigmoid activation function layer, and probability values of the heartbeat classes are output, the number of probability values is corresponding to the number of classes. Different from a single-tag classification network of which the activation function is a Softmax function, while the activation function of the multi-tag classification network is a Sigmoid function. The Sigmoid function gives a high confidence for multiple output classes.

After being processed by the Sigmoid activation function, an output probability value will be limited within [0, 1], which physically means the probability that a sample comprises a certain class. A probability threshold β is set; if an output probability exceeds the probability threshold β, it is determined that this certain class appears in the sample; otherwise, it is determined that this certain class does not appear in the sample.

Making sure whether the probability value exceed a preset threshold, the preset probability threshold will output as a heartbeat classification result if exceeded, however, the output classification result is merely used as a predicted value of pre-classification-result of a training sample.

Step 240, a forward propagation loss of the multi-tag classification model is calculated according to a difference between the predicted value of the pre-classification-result and a tag value of the split-tag, as well as loss function;

The loss function is used to evaluate a difference between a model output (predicted value) and an actual tag.

In this embodiment, the loss function J(w) for calculating the forward propagation loss of the multi-tag classification model is as follows:

$$J(w) = \frac{1}{N}\sum_{n=1}^{N} H(y_n, \hat{y}_n) = -\frac{1}{N}\sum_{n=1}^{N}\sum_{i=1}^{T}\left[y_n^{(i)}\log\hat{y}_n^{(i)} + \left(1 - y_n^{(i)}\right)\log\left(1 - \hat{y}_n^{(i)}\right)\right]$$

Wherein, $y_n$ is the tag value, $\hat{y}_n$ is the predicted value, N is the number of training samples, and T is the number of heartbeat classes of the training samples.

Figure 5:
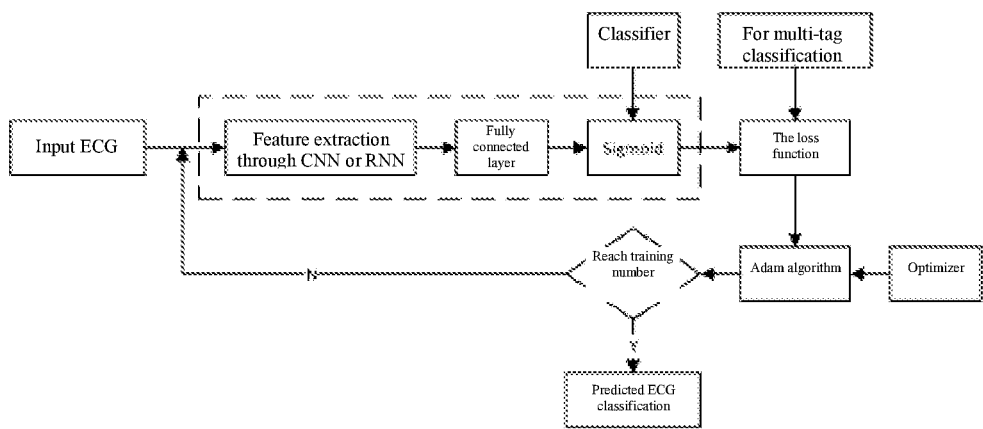
FIG. 5 is a flow diagram of a training process of a multi-tag classification model according to one embodiment of the disclosure.

Step 250, a backward propagation gradient of the multi-tag classification model is calculated through a stochastic gradient descent algorithm according to the forward propagation loss of the multi-tag classification model;

This step may be specifically performed in an optimizer in FIG. 5. The optimizer is an Adam optimizer. The backward propagation gradient is calculated through the optimizer.

Step 260, model parameters of the multi-tag classification model are updated according to the backward propagation gradient;

Step 270, the number of iterations for training is determined;

The number of iterations is selected in the following two ways:

First, a certain number of iterations are selected based on experience, and a model with the best performance is selected from multiple iterations.

Second, an early stopping method is adopted. The performance of the model is calculated in a test set every epoch of iteration, and when performance indicators in the test set start to decrease, training is stopped.

Step 280, when the number of iterations reaches a set training number, the trained multi-tag classification model is obtained.

Step 290, when the number of iterations does not reach the set training number, a next iteration is performed to train the multi-tag classification model with updated model parameters.

The training process of the multi-tag classification model is shown in FIG. 5, and this process implements the training method mentioned above. Wherein, the multi-tag classification model is marked by the dashed box in FIG. 5.

An input ECG and an input of a classifier are the output tensor and the split tag of the training sample. As for a multi-tag classification module, a tag value of an actual tag of the training sample is output to the loss function.

In the training process, for each batch training sample, a loss function is calculated first through forward propagation, then the backward propagation gradient is calculated through a stochastic gradient descent algorithm (Adam algorithm in FIG. 5), and model parameters are updated continuously to make a predicted value constantly approximate to an actual value, so that the training purpose is fulfilled finally.

The heartbeat classification method for multi-tag ECG signal labeling provided by this embodiment of the disclosure adopts a multi-tag classification model to perform heartbeat classification on data segments of heartbeat data in conjunction with a heart impulse conducting model. The multi-tag classification model is obtained by labeling and training data segments of heartbeat data through a multi-tag method according to different diseased regions of the heart. The method solves the problems of conflicts caused by single-tag labeling and too few samples caused by complex-labeling of diseases, and effectively improves the classification performance of the system.

One embodiment of the disclosure further provides a device for implementing the detection method. The device may comprise a physical device and a virtual device, such as equipment, a computer-readable storage medium or a computer program product.

Figure 6:
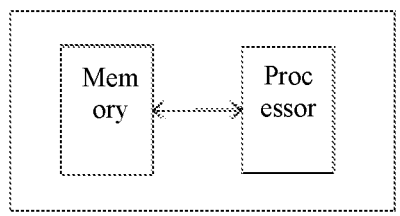
FIG. 6 is a structural diagram of equipment according to one embodiment of the disclosure.

FIG. 6 is a structural diagram of equipment according to one embodiment of the disclosure. The equipment comprises a processor and a memory. The memory is connected to the processor through a bus. The memory could be a non-volatile memory such as a hard disk drive or a flash memory. A software program and an equipment drive program are stored in the memory. The software program can execute various functions of the method provided by the embodiments of the disclosure. The equipment drive program may be a network and interface drive program. The processor is used to execute the software program, and when the software program is executed, the method provided by the embodiments of the disclosure is implemented.

It should be noted that one embodiment of the disclosure further provides a computer-readable storage medium. The computer-readable storage medium stores a computer program, and when the computer program is executed by a processor, the method provided by the embodiments of the disclosure is implemented.

One embodiment of the disclosure further provides a computer program product including instructions. When the computer program product runs on a computer, a processor is enabled to implement the method mentioned above.

Those skilled should further appreciate that unit and arithmetic steps described in the embodiments disclosed in this specification may be implemented by electronic hardware, computer software or a combination of these two. To clearly explain the interchangeability of hardware and software, the composition and steps of the illustrative embodiments have been generally described according to functions. Whether these functions are implemented by hardware or software depends on specific applications and design constraints of the technical solution. For each specific application, those skilled in the art may fulfill the functions described through different methods, which should not be construed as being out of the scope of the disclosure.

The steps of the method or algorithm described in the embodiments disclosed in this specification may be implemented by hardware, software modules executed by a processor, or a combination of these two. The software module may be configured in a random-access memory (RAM), an internal memory, a read-only memory (ROM), an electrically programmable ROM, an electrically erasable and programmable ROM, a register, a hard disk, a removable disk, a CD-ROM, or a storage medium in any other forms in the art.

The purposes, technical solutions and beneficial effects of the disclosure are explained in further detail with reference to the above specific implementations. It can be understood that the above implementations are merely specific ones of the disclosure, and are not used to limit the protection scope of the disclosure. Any amendments or equivalent substitutions and improvements made based on the spirit and principle of the disclosure should also fall within the protection scope of the disclosure.

What is claimed is:

1. A heartbeat classification method for multi-tag ECG signal labeling, comprising:

acquiring, by an ECG signal acquisition device, a heartbeat time sequence, and performing data segmentation on the heartbeat time sequence, using a signal preprocessing circuit to obtain multiple data segments of multi-lead heartbeat data, the heartbeat time sequence comprising the multi-lead heartbeat data;

inputting the data segments into a trained multi-tag classification model executed by a processor of a dedicated ECG analysis system, the multi-tag classification model comprising a feature extraction module implemented using a Convolutional Neural Network (CNN), a fully connected layer and a Sigmoid activation function layer;

performing feature extraction on the input data segments by the feature extraction module to obtain high-dimensional embedding information, wherein the high-dimensional embedding information comprising morphological and temporal heartbeat class features extracted from multi-lead signal patterns corresponding to each of the data segments;

sending the high-dimensional embedding information into the fully connected layer, and outputting a one-dimensional vector [1, N], wherein N is a class number of heartbeat classes of the data segments;

inputting the one-dimensional vector [1, N] into the Sigmoid activation function layer, and outputting probability values of the class number for the heartbeat classes, the probability values being within [0, 1]; and determining, by the ECG analysis system, whether the probability values exceed a preset probability threshold, and outputting a heartbeat class having a probability value exceeding the preset probability threshold as a heartbeat classification result for real-time clinical display or storage in a patient record system;

further comprising training the multi-tag classification model wherein before the step of inputting the data segments into the trained multi-tag classification Model;
wherein training the multi-tag classification model comprises:
acquiring, by an ECG database management module, a heartbeat time sequence used as a training sample, and performing data segmentation on the heartbeat time sequence using automated preprocessing to obtain multiple sample data segments, each of the sample data segments having a classification tag corresponding to one or more manually labeled heartbeat classes;
recognizing a classification tag of a data segment having both a ventricular type and a supraventricular type from the classification tags, and splitting the classification tag to obtain split tags, each of the split tags corresponding to one heartbeat class;
performing, by a signal processing unit, data combination and format conversion on the sample data segments to obtain an output tensor and a split tag of the heartbeat time sequence used as the training sample;
inputting the output tensor and the split tag of the training sample into a deep learning model training framework executed on a computing server, and obtaining a predicted value of a pre-classification-result of the training sample according to the output tensor;
calculating a forward propagation loss of the multi-tag classification model according to a difference between the predicted value of the pre-classification-result and a tag value of the split tag, as well as a loss function;
calculating a backward propagation gradient of the multi-tag classification model through a stochastic gradient descent algorithm according to the forward propagation loss of the multi-tag classification model;
updating model parameters of the multi-tag classification model according to the back propagation gradient;
determining a number of iterations for training; and
obtaining the trained multi-tag classification model when the number of iterations reaches a set training number.

2. The heartbeat classification method according to claim 1, further comprising performing a next iteration for training on the multi-tag classification model with updated model parameters when the number of iterations does not reach the set training number.

3. The heartbeat classification method according to claim 1, wherein processing the data segments to obtain an output tensor of the heartbeat time sequence after tag splitting comprises:
performing data combination on the multiple data segments of the multi-lead heartbeat data to obtain four-dimensional tensor, the four-dimensional tensor having four factors {B, H, W, C}, wherein the factor B is a batch of data, the factor H is a height, the factor W is a width, and the factor C is channel data; the batch of data is the number of multi-lead heartbeat data; and
performing tensor format conversion on the four-dimensional tensor to shrink channel data in the four-dimensional tensor to 1, and a tensor shaped as {B, $H_1$, $W_1$, 1} of the heartbeat time sequence used as the sample is output.

4. The heartbeat classification method according to claim 1, wherein calculating the loss function for calculating the forward propagation loss of the multi-tag classification model according to the difference between the predicted value of the pre-classification-result and the tag value of the manually labeled tag comprises:

$$J(w) = \frac{1}{N}\sum_{n=1}^{N}H(y_n, \hat{y}_n) = -\frac{1}{N}\sum_{n=1}^{N}\sum_{i=1}^{T}\left[y_n^{(i)}\log\hat{y}_n^{(i)} + (1 - y_n^{(i)})\log(1 - \hat{y}_n^{(i)})\right]$$

wherein, J(w) is the loss function, $y_n$ is the tag value, $\hat{y}_n$ is the predicted value, N is the number of training samples, and T is the class number of heartbeat classes of each group of training samples.

5. The heartbeat classification method according to claim 1, further comprising using classification tags of data fragments without the ventricular type and the supraventricular type as split tags before the inputting the output tensor and the split tag of the training sample into a multi-tag classification model to be trained.

6. The heartbeat classification method according to claim 1, wherein the performing feature extraction on an output tensor by the feature extraction module comprises:
performing feature extraction on the output tensor by the feature extraction module through a Convolutional Neural Network (CNN) or a Recursive Neural Network (RNN).

7. An electrocardiogram (ECG) analysis device, comprising:
a signal acquisition interface configured to receive multi-lead ECG signals in real-time;
a memory configured to store instructions of a heartbeat classification algorithm; and
a processor configured to execute the stored instructions to implement the method according to claim 1, and to output heartbeat classification results for real-time monitoring, diagnosis, or electronic medical record storage.

8. A computer program product comprising an instruction, wherein the instruction is recorded on a non-transitory computer-readable medium, and enabling a computer to implement the method according to claim 1 when running on the computer.

9. A non-transitory computer-readable storage medium, comprising an instruction, wherein when the instruction runs on a computer, the computer is enabled to implement the method according to claim 1.

* * * * *